(12) United States Patent
Chawla et al.

(10) Patent No.: US 8,325,713 B2
(45) Date of Patent: Dec. 4, 2012

(54) SYSTEM AND METHOD TO ENABLE LARGE MTUS IN DATA CENTER ETHERNET NETWORKS

(75) Inventors: Gaurav Chawla, Austin, TX (US); Hendrich M. Hernandez, Round Rock, TX (US); Robert L. Winter, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 242 days.

(21) Appl. No.: 12/715,531

(22) Filed: Mar. 2, 2010

(65) Prior Publication Data

US 2011/0216669 A1 Sep. 8, 2011

(51) Int. Cl.
*H04L 12/28* (2006.01)
(52) U.S. Cl. ......... 370/354; 370/474; 709/220; 709/233
(58) Field of Classification Search .................. 370/230, 370/232, 235, 254, 249, 354, 369, 389, 390, 370/392, 397, 474, 503, 506, 509; 709/220, 709/232, 233, 239
See application file for complete search history.

(56) References Cited

U.S. PATENT DOCUMENTS

| 5,220,596 | A | 6/1993 | Patel |
| 6,973,085 | B1 | 12/2005 | Acharya |
| 7,512,120 | B2 * | 3/2009 | Takahashi et al. ............ 370/354 |
| 2003/0016628 | A1 * | 1/2003 | Kadambi et al. .............. 370/235 |
| 2003/0185249 | A1 | 10/2003 | Davies et al. |
| 2004/0218550 | A1 * | 11/2004 | Kim .............................. 370/254 |
| 2006/0165070 | A1 * | 7/2006 | Hall et al. ...................... 370/369 |
| 2007/0011352 | A1 * | 1/2007 | Martini et al. ................ 709/239 |
| 2008/0159140 | A1 * | 7/2008 | Robinson et al. ............. 370/232 |
| 2009/0003241 | A1 * | 1/2009 | Teng ............................. 370/254 |
| 2009/0296738 | A1 * | 12/2009 | Shimada ....................... 370/474 |
| 2010/0287262 | A1 * | 11/2010 | Elzur ............................ 709/220 |

OTHER PUBLICATIONS

"Operating System and Device Management," IBM Corporation AIX Version 5.3, SC23-5204-03, Fourth Edition, Oct. 2009, pp. 202-224 http://publib.boulder.ibm.com/infocenter/pseries/v5r3/topic/com.ibm.aix.baseadmn/doc/baseadmndita/baseadmndita_pdf.

* cited by examiner

*Primary Examiner* — Hassan Phillips
*Assistant Examiner* — Ajay Cattungal
(74) *Attorney, Agent, or Firm* — Larson Newman, LLP (57) ABSTRACT

A method of configuring a port on a network device includes receiving a frame of information, determining that the frame includes maximum transmission unit (MTU) information, and configuring a prioritized receive queue on the port with an MTU size based on the MTU information. The MTU size is different than another MTU size of another prioritized receive queue on the port. A network interface includes a port, a de-multiplexer coupled to an output or the port, and prioritized receive queues that each have an MTTU size. A first prioritized receive queue has an MTU size different than a second prioritized receive queue.

19 Claims, 4 Drawing Sheets

SYSTEM AND METHOD TO ENABLE LARGE MTUS IN DATA CENTER ETHERNET NETWORKS

FIELD OF THE DISCLOSURE

This disclosure relates generally to information handling systems, and relates more particularly to network switching in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random-access memory), nonvolatile such as read-only memory or flash memory) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices such as a keyboard, a mouse, a video/graphic display, or any combination thereof The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Figure 1:
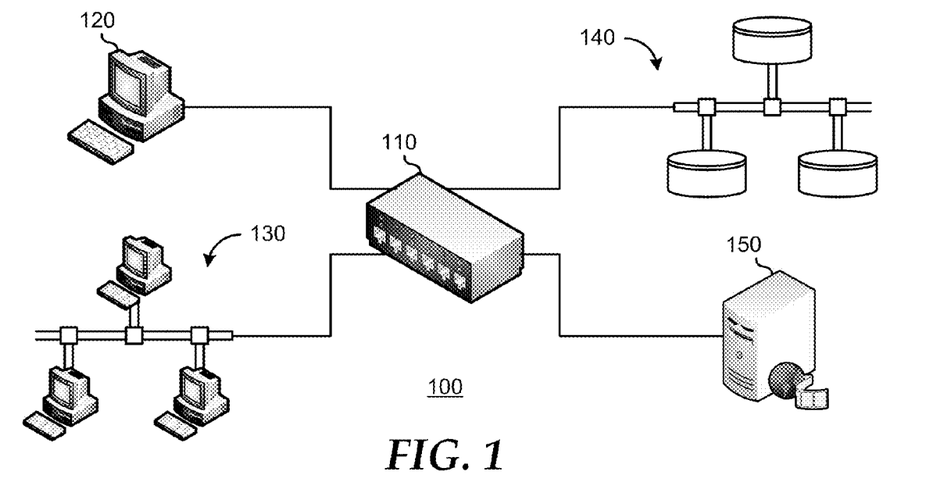
FIG. 1 is a functional block diagram of a network system according to an embodiment of the present disclosure.

FIG. 1 illustrates a network system 100 according to an embodiment of the present disclosure, including a network switch 110, a network management station 120, a user network 130, a storage network 140, and an application server 150. Network switch 110 includes multiple network interface ports for forming connections to network interface ports on network management station 120, user network 130, storage network 140, and application server 150. As such, network management station 120 includes a network interface port that is connected to a network interface port of network switch 110, user network 130 includes a network interface port that is connected to another network interface port of network switch 110, storage network 140 includes a network interface port that is connected to a different network interface port of network switch 110, and application server 150 includes a network interface port that is connected to yet another network interface port of network switch 110. In a particular embodiment, the network interface ports are Ethernet ports in accordance with the Institute of Electrical and Electronics Engineers (IEEE) 802.1Q Standard for Data Center Bridging (DCB).

Network switch 110 represents one or more switch elements (not illustrated) that function to route data communications between network management station 120, user network 130, storage network 140, and application server 150. The switch elements are associated with one or more network switching fabrics. For example, switch elements within network switch 110 can be Ethernet switch elements, Fibre Channel switch elements, Internet Small Computer System Interface (iSCSI) switch elements, switch elements according to another network switching fabric, or a combination thereof. The ports of network switch 110 each represent one or more data communication links between the elements connected thereto, and that supply a bandwidth capacity for communicating data between the components connected thereto.

Network management station 120 represents one or more information handling systems (not illustrated) that are associated with network system 100, where network operating technicians (not illustrated) can access network system 100 to maintain, repair, upgrade, or reconfigure network system 100. User network 130 represents a network of information handling systems. In a particular embodiment, user network 130 is operated in common with network system 100. For example, user network 130 can represent a local area network (LAN) or a wide area network (WAN) that is associated with network system 100, such that the resources of network system 100 are proprietary to the operator and primarily available to the users of user network 100. In another embodiment, user network 130 is associated with a network system outside of network system 100. For example, user network 130 can represent the Internet or other publicly available network that is not operated in common with network system 100, and the resources of network system 100 may be publicly shared.

Storage network 140 represents one or more storage elements (not illustrated) that are available to network system 100 and that are accessible through network switch 110. For example, storage network 140 can include one or more storage area networks (SANs). Storage network 140 supplies a storage capacity for storing data. In a particular embodiment (not illustrated), storage network 140 can also represent connectivity to other information handling systems, other devices or resources, or a combination thereof. Application server 150 represents one or more server elements (not illustrated) that are available to network system 100 to provide a variety of services and functions. For example, application server 150 can include a media server, an e-mail server, another type of server, or a combination thereof. In another example, application server 150 can include the functions of a virtual machine manager associated with one or more virtual machines operating on one or more information handling systems.

Figure 2:
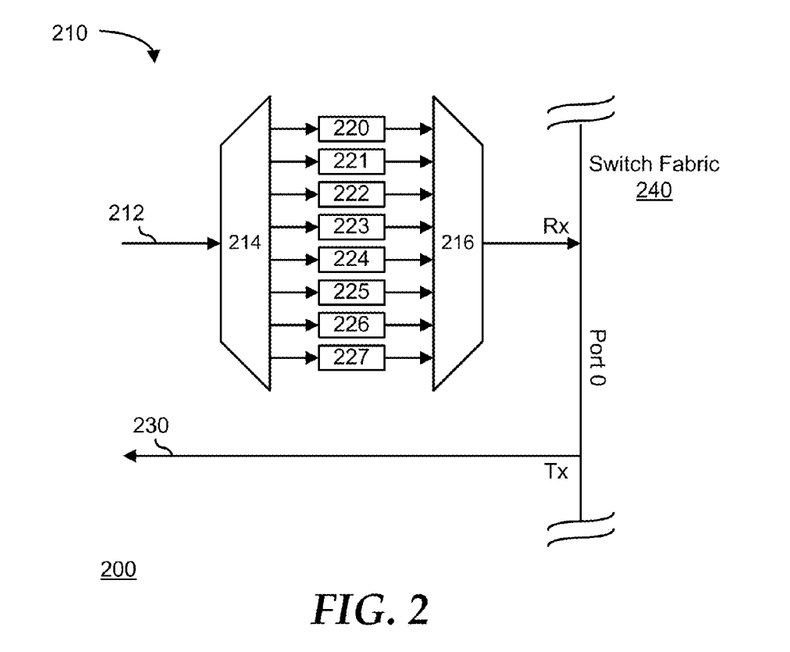
FIG. 2 is a schematic diagram of an exemplary embodiment of a network interface port.

FIG. 2 illustrates a network interface port 200 according to an embodiment of the present disclosure, including a receive channel 210, a transmit connection 230, and a switch fabric 240. Receive channel 210 includes a receive connection 212, a de-multiplexer 214, a group of receive queues 220-227, and a multiplexer 216. Receive connection 212 receives data communications from an element (not illustrated) of a network system similar to network system 100, and provides the data communications to de-multiplexer 214. De-multiplexer 214 classifies frames included in the data communications by a priority level and allocates the frames to the appropriate receive queues 220-227 that are each associated with a particular priority level. Receive queues 220-227 provide the prioritized frames to multiplexer 216 which aggregates the frames and outputs them to switch fabric 240 for forwarding to a transmit channel (not illustrated) associated with another particular port (not illustrated) that is the target for each particular frame. Note that the transmission of communications is indicated in one direction only, but in practice a corresponding structure is provided to support full bi-directional data flow between elements of network system 100.

In an embodiment, network interface port 200 is an Ethernet port in accordance with IEEE 802.1Qbb Specification for Priority-Based Flow Control (PFC). As such, each frame received on receive connection 212 includes a 3-bit priority level, defining priority levels from 0 to 7, with 7 being the highest priority level and 0 being the lowest priority level. De-multiplexer 214 allocates frames with a priority level of 0 to receive queue 220, frames with a priority level of 1 to receive queue 221, and so on to frames with a priority level of 7 to receive queue 227. In aggregating the prioritized frames, multiplexer 216 first forwards frames from receive queue 227 until all frames with a priority level of 7 are forwarded, and then from receive queue 226 until all frames with a priority level of 6 are forwarded, and so on to receive queue 220 until all frames with a priority level of 0 are forwarded. If a situation occurs in which a receive queue 221-227 is blocked by receiver overload, then the PAUSE frame mechanism is used to suppress transmission of frames from that specific receive queue 221-227, while still forwarding frames with higher priority levels. For example, if the entire receive bandwidth of network interface port 200 is utilized in forwarding frames with priority levels of 4-7, then the PAUSE frame will indicate that no additional frames with priority levels of 0-3 should be sent to network interface port 200. Transmission of frames with the priority levels indicated in the PAUSE frame will be suspended for a time period indicated in the PAUSE frame, or until an UNPAUSE frame is send to the element indicating that transmission of lower priority level frames may be resumed.

When network interface port 200 sends a PAUSE frame for a particular priority level 0-7, the associated receive queue 220-227 continues to buffer received frames of the particular priority level 0-7 until the connected element receives the PAUSE frame and ceases transmission of frames of the particular priority level 0-7. The size of receive queues 220-227 is therefore given as:

$$\text{Receive\_Queue\_Size} = (2 * \text{MTU\_Size}) + (\text{Link\_Delay} * \text{Link\_Speed}) \quad \text{Equation 1}$$

where MTU_Size, or Maximum Transmission Unit size, is the size in bytes of the largest frame that is handled by network interface port 200, Link_Delay is the time it takes for a frame to traverse the connection, and Link_Speed is the bit rate of the connection. For the purposes of further illustration, assume that:

$$\text{Link\_Delay} = 0. \quad \text{Equation 2}$$

Then the total memory capacity for an element of network system 100, for example network switch 110, that needs to be reserved for the PFC buffering is given as:

Total_Receive_Queue=
　　Ports*Queues*Receive_Queue_Size.　　　　Equation 3

The MTU size for a port is configurable within the range of 1,500 bytes to 9,000 bytes. Thus, if network switch 110 has 24 ports with 8 receive queues, and an MTU size of 1,500 bytes, then:

Total_Receive_Queue=24*8*(2*1,500)=576 KB.　　Equation 4

However, if the MTU size is changed to 9000 bytes, then:

Total_Receive_Queue=24*8*(2*9,000)=3,456 KB.　　Equation 5

Thus, the total memory capacity reserved for PFC buffering depends heavily on the MTU size.

In the embodiment illustrated by Equations 4 and 5, it is assumed that all receive queues 220-227 are configured with the same MTU size. While some types of network traffic become more efficient with larger MTU sizes, increasing the MTU size uniformly for all queues requires larger amounts of memory to be reserved for PFC buffering, and can lead to increased latency for other types of network traffic Therefore, the administrator of network system 100 may select an MTU size for network system 100 to optimize overall network performance and to more efficiently utilize the memory resources within network switch 110.

In another embodiment, each receive queue 220-227 is separately configurable for MTU size. Table 1 includes an example of a DCB profile table with separately configured MTU sizes for each priority level. The first column lists the priority levels 0-7. The second column lists a traffic type associated with each priority level, where LAN indicates Local Area Network traffic, SAN-FCoE indicates Fiber Channel over Ethernet Storage Area Network traffic, SAN-iSCSI indicates Internet SCSI Storage Area Network traffic, and IPC indicates Inter-Process Communication traffic. The third column lists the MTU size for each priority level. Here priority levels 1-4 and 7 are configured with an MTU size of 1,500 bytes, priority level 5 is configured with an MTU size of 2,500 bytes, and priority level 6 is configured with an MTU size of 9,000 bytes. In this embodiment, the total memory capacity for network switch 110 that needs to be reserved for the PFC buffering is given as:

$$\text{Total\_Receive\_Queue} = 24*((6*2*1{,}500) + \\ (1*2*2{,}500) + (1*2*9{,}000)) \\ = 24*(18{,}000 + 5{,}000 + 18{,}000) \\ = 984 \text{ KB}$$

Equation 6

In this way, the administrator of network system 100 can select MTU sizes for network system 100 that are optimized to the type of traffic while reducing the amount of memory allocated to PFC buffering.

TABLE 1

DBC Profile with Priority Specific MTU Sizes

| Priority | Traffic Type | MTU Size |
| --- | --- | --- |
| 0 | Management | 1500 bytes |
| 1 | Background | 1500 bytes |
| 2 | Spare | 1500 bytes |

TABLE 1-continued

DBC Profile with Priority Specific MTU Sizes

| Priority | Traffic Type | MTU Size |
| --- | --- | --- |
| 3 | LAN | 1500 bytes |
| 4 | Streaming Media | 1500 bytes |
| 5 | SAN-FCoE | 2500 bytes |
| 6 | SAN-iSCSI | 9000 bytes |
| 7 | IPC | 1500 bytes |

In a particular embodiment, the MTU size for network system 100 is configured through in-band communications on the ports. For example, management system 120 can initiate an Ethernet transaction wherein management system 120 addresses an Ethernet frame to network switch 110, user network 130, storage network 140, application server 150, or a combination thereof. The Ethernet frame includes configuration information that the elements of network system 100 use to configure the communication links, buffering and routing behavior, or other configurable parameters of the various elements. The elements receive the Ethernet frame and determine if the receiving element is the target of the Ethernet frame. If so, the receiving element decodes the frame to identify the configuration information and implements the functions called for in the configuration information. In a particular embodiment, the Ethernet frame is in accordance with the IEEE 802.1Qbb standard.

Figure 3:
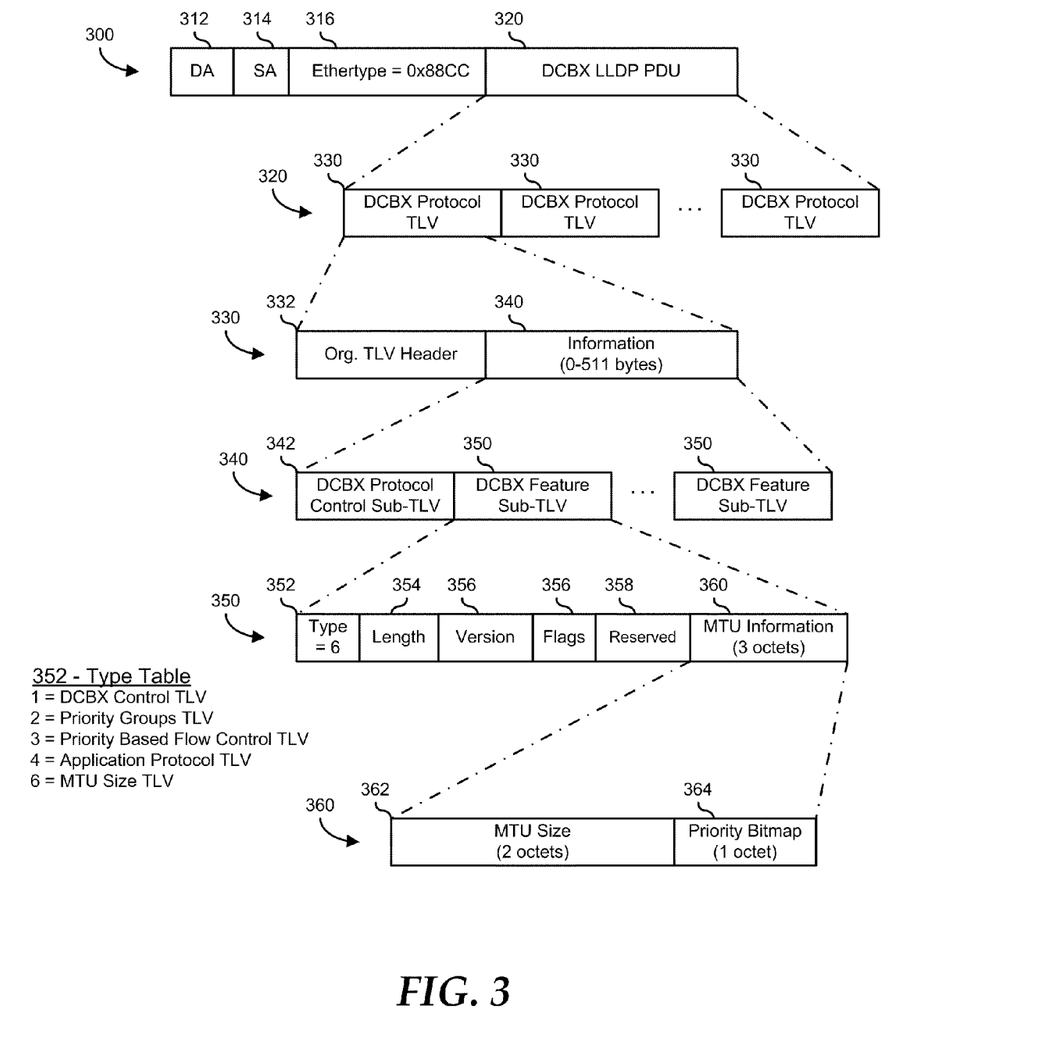
FIG. 3 is a view of an Ethernet frame for a Data Center Bridging Capabilities Exchange Link Layer Discovery Protocol transaction according to an embodiment of the present disclosure.

FIG. 3 illustrates an embodiment of an Ethernet frame 300 for a Data Center Bridging Capabilities Exchange (DCBX) Link Layer Discovery Protocol (LLDP) transaction. Frame 300 includes a destination address (DA) field 312, a source address (SA) field 314, an Ethertype field 316 labeled "Ethertype=0x88CC," and a protocol data unit (PDU) field 320 labeled "DCBX LLDP PDU." DA field 312 includes the address of the target device that is the destination of Ethernet frame 300. SA field 314 includes the address of the initiating device that is the source of Ethernet frame 300. Ethertype field 316 includes a coded description of the fact that Ethernet frame 300 is a DCBX LLDP type Ethernet frame. PDU field 320 includes one or more DCBX Protocol type/length/value (TLV) fields 330.

DCBX Protocol TLV 330 includes an organization TLV header 332 and an information field 340. Organization TLV header includes type, length, Organizationally Unique Identifier (OUI), and sub-type fields (not illustrated). Information field 340, also known as a Protocol TLV structure, consists of between 0 and 511 bytes, and includes a DCBX Protocol Control Sub-TLV 340 and one or more DCBX Feature Sub-TLVs 350. DCBX Feature Sub-TLVs 350 includes a type field 352, a length field 354, a version field 356, a flags field 356, a reserved field 358, and an MTU information field 360. As illustrated, type field 352 has a value of 6, indicating that DCBX Feature Sub-TLV 350 is an MTU size TLV, as can be seen in Table 2.

TABLE 2

DCBX Feature Sub-TLV Type

| Value | TLV Type |
| --- | --- |
| 1 | DCBX Control TLV |
| 2 | Priority Groups TLV |
| 3 | Priority Based Flow Control TLV |
| 4 | Application Protocol TLV |
| 6 | MTU Size TLV |

MTU information field 360 consists of three octets of information and includes an MTU size field 362 and a priority bitmap 364. MTU size field 362 consists of 2 octets of information and defines the MTU size for the priority levels as selected in priority bitmap 364. In a particular embodiment, valid MTU size values are between 1500 bytes and 9000 bytes. Priority bitmap 364 consists of one octet of information, where each bit is associated with a particular priority level. In an embodiment, a logic "1" in a particular location of priority bitmap 364 indicates that the MTU size, as indicated in MTU size field 362, is to be applied to the associated priority level, and a logic "0" in a particular location indicates that the associated priority level retains a default MTU size or a previously selected MTU size. As indicated above, information field 340 may include more than one DCBX Feature Sub-TLVs 350. As such, several MTU Size TLVs can be issued in a single frame 300, and thus all priority levels can be configured with custom MTU sizes in a single frame.

Figure 4:
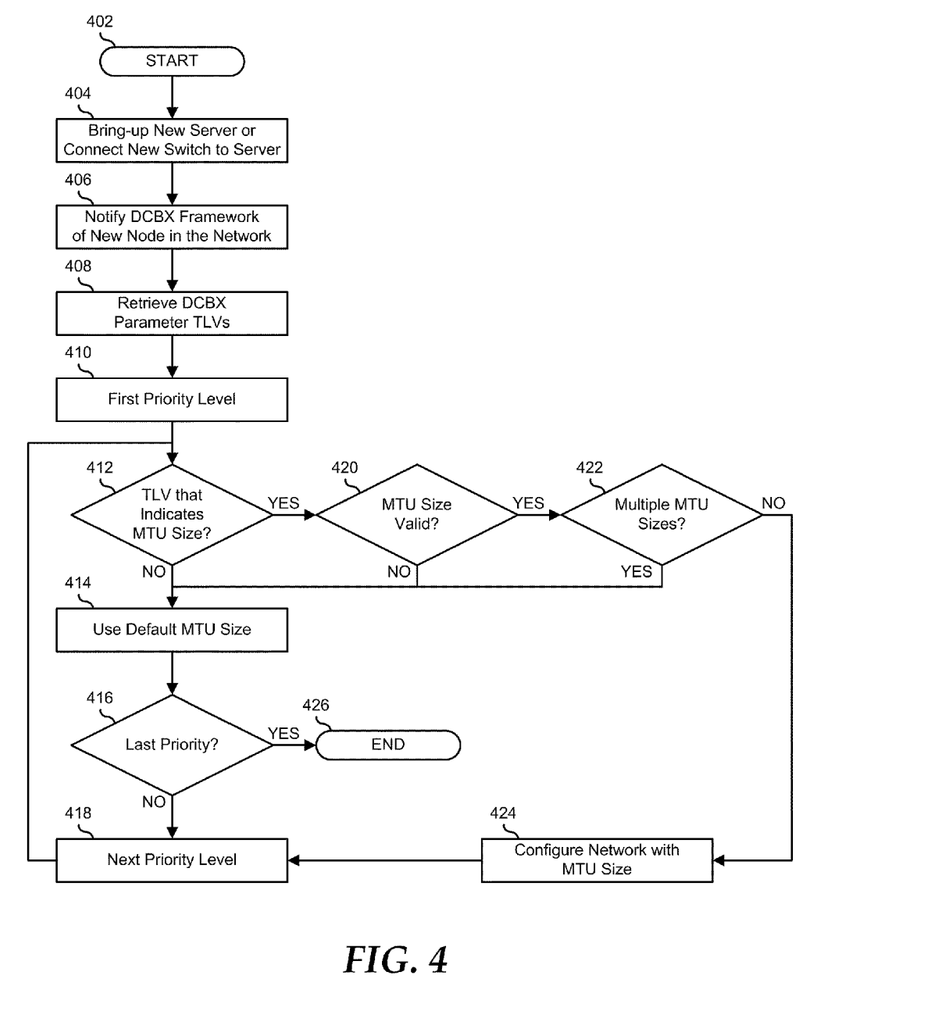
FIG. 4 is a flowchart illustrating a method for enabling large Maximum Transmission Unit (MTU) sizes in data center Ethernet networks via per priority MTU sizing.

FIG. 4 illustrates a method of enabling large MTUs in data center Ethernet networks via per priority MTU sizing, in accordance with an embodiment of the present disclosure. The method starts at block 402. A new server is brought up on a network, or a server is connected to a new switch on the network in block 404. For example, application server 150 can be brought up on network system 100 and connected to the network switch 110. The server bring-up or connection to the new switch causes a DCBX framework to be notified that a new node exists on the network in block 406. For example, network management station 120 can include DCBX Framework software that permits an operator of network system 100 to manage DCBX client software in the elements of network management system 100. As such, the newly brought up server or the newly attached switch can include DCBX client software which indicates its presence to the DCBX framework software when it is connected to network system 100.

The DCBX framework retrieves DCBX parameter TLVs from the elements of the network in block 408. For example, network management station 120 can issue an Ethernet frame with a DCBX LLDP PDU to retrieve DCBX parameter TLVs from the elements of network system 100. A first priority level is selected in block 410. A decision is made as to whether or not a TLV was retrieved that indicates an MTU size for the first priority level in decision block 412. If not, then the "NO" branch of decision block 412 is taken and a default MTU size is used for the first priority level in block 414. For example, the default MTU size may be 1500 bytes. A decision is made as to whether or not the priority level is the last priority level in decision block 416. If not, then the next priority level is selected in block 418 and processing returns to block 412 where a decision is made as to whether or not a TLV was retrieved that indicates an MTU size for the next priority level. If the priority level is the last priority level, then the "YES" branch of decision block 416 is taken, and processing ends in block 426.

If a TLV was retrieved that indicates an MTU size for the first priority level, then the "YES" branch of decision block 412 is taken, and a decision is made as to whether the MTU size is a valid MTU size in decision block 420. For example, the TLV may indicate an MTU size that is smaller than 1500 bytes or larger than 9000 bytes. If the MTU size is not a valid MTU size, then the "NO" branch of decision block 420 is taken, and processing continues in block 414 where the default MTU size is used for the priority level. If the MTU size is a valid MTU size, then the "YES" branch of decision block 420 is taken, and a decision is made as to whether or not more than one MTU size is given in the TLVs for the priority level in decision block 422. If so, then the "YES" branch of decision block 422 is taken, and processing continues in block 414 where the default MTU size is used for the priority level. If only one MTU size is given in the TLVs for the priority level, then the "NO" branch of decision block 422 is taken, the network is configured with the indicated MTU size in block 424, and processing continues in block 418 where the next priority level is selected.

Figure 5:
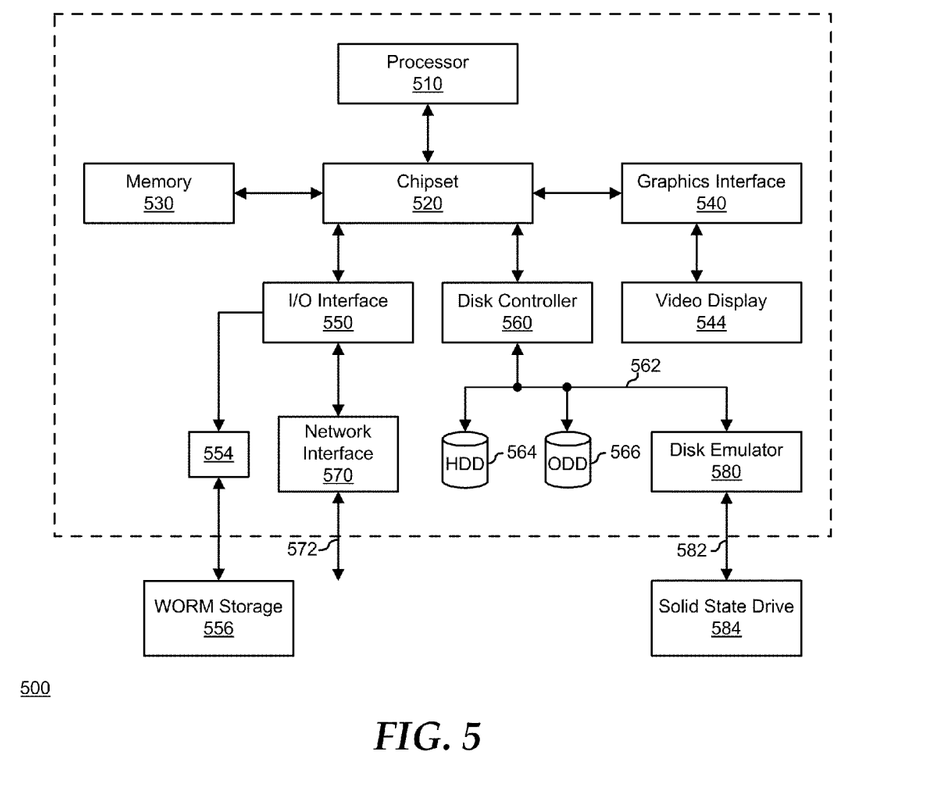
FIG. 5 is a functional block diagram illustrating an exemplary embodiment of an information handling system.

In a particular embodiment, an information handling system can be used to function as one or more of the network systems, or carry out one or more of the methods described above. In another embodiment, one or more of the systems described above can be implemented in the form of an information handling system. FIG. 5 illustrates a functional block diagram of an embodiment of an information handling system, generally designated as 500. Information handling system 500 includes processor 510, a chipset 520, a memory 530, a graphics interface 540, an input/output (I/O) interface 550, a disk controller 560, a network interface 570, and a disk emulator 580.

Processor 510 is coupled to chipset 520. Chipset 520 supports processor 510, allowing processor 510 to process machine-executable code. In a particular embodiment (not illustrated), information handling system 500 includes one or more additional processors, and chipset 520 supports the multiple processors, allowing for simultaneous processing by each of the processors, permitting the exchange of information between the processors and the other elements of information handling system 500. Processor 510 can be coupled to chipset 520 via a unique channel, or via a bus that shares information between processor 510, chipset 520, and other elements of information handling system 500.

Memory 530 is coupled to chipset 520. Memory 530 can be coupled to chipset 520 via a unique channel, or via a bus that shares information between chipset 520, memory 530, and other elements of information handling system 500. In particular, a bus can share information between processor 510, chipset 520 and memory 530. In a particular embodiment (not illustrated), processor 510 is coupled to memory 530 through a unique channel. In accordance with another aspect (not illustrated), an information handling system can include a separate memory dedicated to each of the processors. A non-limiting example of memory 530 includes static, dynamic. Or non-volatile random access memory (SRAM, DRAM, or NVRAM), read only memory (ROM), flash memory, another type of memory, or any combination thereof.

Graphics interface 540 is coupled to chipset 520. Graphics interface 540 can be coupled to chipset 520 via a unique channel, or via a bus that shares information between chipset 520, graphics interface 540, and other elements of information handling system 500. Graphics interface 540 is coupled to a video display 544. Other graphics interfaces (not illustrated) can also be used in addition to graphics interface 540 if needed or desired. Video display 544 can include one or more types of video displays, such as a flat panel display or other type of display device.

I/O interface 550 is coupled to chipset 520. I/O interface 550 can be coupled to chipset 520 via a unique channel, or via a bus that shares information between chipset 520, I/O interface 550, and other elements of information handling system 500. Other I/O interfaces (not illustrated) can also be used in addition to I/O interface 550 if needed or desired. I/O interface 550 is coupled to one or more add-on resources 554. Add-on resource 554 can also include another data storage system, a graphics interface, a network interface card (NIC), a sound/video processing card, another suitable add-on resource or any combination thereof.

Network interface device 570 is coupled to I/O interface 550. Network interface 570 can be coupled to I/O interface 550 via a unique channel, or via a bus that shares information between I/O interface 550, network interface 570, and other elements of information handling system 500. Other network interfaces (not illustrated) can also be used in addition to network interface 570 if needed or desired. Network interface 570 can be a network interface card (NIC) disposed within information handling system 500, on a main circuit board (e.g., a baseboard, a motherboard, or any combination thereof), integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Disk controller 560 is coupled to chipset 510. Disk controller 560 can be coupled to chipset 520 via a unique channel, or via a bus that shares information between chipset 520, disk controller 560, and other elements of information handling system 500. Other disk controllers (not illustrated) can also be used in addition to disk controller 560 if needed or desired. Disk controller 560 can include a disk interface 562. Disk controller 560 can be coupled to one or more disk drives via disk interface 562. Such disk drives include a hard disk drive (HDD) 564 or an optical disk drive (ODD) 566 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 560 can be coupled to disk emulator 580. Disk emulator 580 can permit a solid-state drive 584 to be coupled to information handling system 500 via an external interface. The external interface can include industry standard busses (e.g., USB or IEEE 1384 (Firewire)) or proprietary busses, or any combination thereof. Alternatively, solid-state drive 584 can be disposed within information handling system 500.

In the embodiments described above, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of configuring a port on a network device, comprising:
    receiving at the network device a first frame of information, the first frame comprising a first type-length-value (TLV) and a second TLV;
    determining that a first field of the first TLV includes first maximum transmission unit (MTU) information, and that a second field of the second TLV includes second MTU information;
    configuring a first prioritized receive queue of a plurality of prioritized receive queues on the port with a first MTU size based upon the first field; and
    configuring a second prioritized receive queue of the prioritized receive queues with a second MTU size based upon the second field, wherein the first MTU size is different than the second MTU.

2. The method of claim 1, wherein the first field includes an MTU size field, the value of the MTU size field being associated with the first MTU size.

3. The method of claim 2, wherein the first TLV further includes a bitmap field, wherein each bit of the bitmap field is associated with a particular prioritized receive queue of the plurality of prioritized receive queues.

4. The method of claim 3, wherein;
    a first bit in the bitmap field is set; and the first prioritized receive queue is associated with the first bit.

5. The method of claim 4, wherein:
a second bit in the bitmap field is set; and
the method further comprises configuring a third prioritized receive queue of a plurality of prioritized receive queues on the port with the first MTU size based upon the first field, wherein the third prioritized receive queue is associated with the second bit.

6. The method of claim 2, further comprising:
determining that the value of the MTU size field is a valid MTU size; and
wherein configuring the first prioritized receive queue is in response to determining that the value of the MTU size field is a valid MTU size value.

7. The method of claim 6, wherein a valid MTU size comprises MTU sizes that are:
greater than or equal to 1500 bytes; and
less than or equal to 9000 bytes.

8. The method of claim 1, further comprising:
receiving at the network device a second frame of information, the second frame comprising a third TLV;
determining that a third field of the third TLV includes third MTU information; and
configuring a third prioritized receive queue of the plurality of prioritized receive queues with a third MTU size based upon the third field, wherein the third MTU size is different than the first MTU size and the second MTU size.

9. Machine-executable code for an information handling system having a first resource, wherein the machine-executable code is embedded within a non-transitory medium and includes instructions for carrying out a method comprising:
receiving a first frame of information, the first frame comprising a first type-length-value (TLV) and a second TLV;
determining that a first field of the first TLV includes first maximum transmission unit (MTU) information, and that a second field of the second TLV includes second MTU information;
configuring a first prioritized receive queue of a plurality of prioritized receive queues on a network port with a first MTU size based upon the first field; and
configuring a second prioritized receive queue of the prioritized receive queues with a second MTU size based upon the second field, wherein the first MTU size is different than the second MTU size.

10. The machine-executable code of claim 9, wherein the first field includes an MTU size field, the value of the MTU size field being associated with the first MTU size.

11. The machine-executable code of claim 10, wherein the first TLV further includes a bitmap field, wherein each bit of the bitmap field is associated with a particular prioritized receive queue of the plurality of prioritized receive queues.

12. The machine-executable code of claim 11, wherein;
a first bit in the bitmap field is set; and
the first prioritized receive queue is associated with the first bit.

13. The machine-executable code of claim 12, wherein:
a second bit in the bitmap field is set; and
the method further comprises configuring a third prioritized receive queue of a plurality of prioritized receive queues on the port with the first MTU size based upon the first field, wherein the third prioritized receive queue is associated with the second bit.

14. The machine-executable code of claim 10, the method further comprising:
determining that the value of the MTU size field is a valid MTU size; and
wherein configuring the first prioritized receive queue is in response to determining that the value of the MTU size field is a valid MTU size value.

15. The machine-executable code of claim 14, wherein a valid MTU size comprises MTU sizes that are:
greater than or equal to 1500 bytes; and
less than or equal to 9000 bytes.

16. The machine-executable code of claim 9, the method further comprising:
receiving a second frame of information, the second frame comprising a third TLV;
determining that a third field of the third TLV includes third MTU information; and
configuring a third prioritized receive queue of the plurality of prioritized receive queues with a third MTU size based upon the third field, wherein the third MTU size is different than the first MTU size and the second MTU size.

17. A network interface comprising:
a port including a first input operably coupleable to an Ethernet network, and a first output;
a de-multiplexer including a second input and a plurality of second outputs, the second input being coupled to the first output of the port; and
a plurality of prioritized receive queues, each of the plurality of prioritized receive queues including a third input and a third output, each third input being coupled to one of the plurality of second outputs of the de-multiplexer, and wherein each of the plurality of prioritized receive queues has a maximum transmission unit (MTU) size;
wherein the network interface is operable to:
receive an Ethernet frame comprising a first type-length-value (TLV) and a second TLV;
determine that the first TLV includes first maximum transmission unit (MTU) information, and that the second TLV includes second MTU information;
configure the first prioritized receive queue with a first MTU size based upon the first TLV; and
configure the second prioritized receive queue with a second MTU size based upon the second TLV, wherein the first MTU size is different than the second MTU size.

18. The network interface of claim 17, wherein the Ethernet frame is a Data Center Bridging Capabilities Exchange Link Layer Discovery Protocol transaction.

19. The network interface of claim 17, wherein the plurality of prioritized receive queues operate according to a Priority-Based Flow Control.

* * * * *